United States Patent
Onozawa

(10) Patent No.: US 10,746,883 B2
(45) Date of Patent: Aug. 18, 2020

(54) POSITION ESTIMATION APPARATUS

(71) Applicant: CASIO COMPUTER CO., LTD., Tokyo (JP)

(72) Inventor: Masaru Onozawa, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 291 days.

(21) Appl. No.: 15/867,941

(22) Filed: Jan. 11, 2018

(65) Prior Publication Data

US 2018/0267173 A1 Sep. 20, 2018

(30) Foreign Application Priority Data

Mar. 17, 2017 (JP) .................. 2017-053388

(51) Int. Cl.
| | |
|---|---|
| *G01S 19/51* | (2010.01) |
| *G01C 21/00* | (2006.01) |
| *G01C 5/06* | (2006.01) |
| *G01C 21/16* | (2006.01) |

(52) U.S. Cl.
CPC ............. *G01S 19/51* (2013.01); *G01C 5/06* (2013.01); *G01C 21/005* (2013.01); *G01C 21/165* (2013.01)

(58) Field of Classification Search
CPC ........ G01S 19/51; G01S 19/14; G01S 5/0072; G01S 5/0027; G01C 5/06; G01C 21/005; G01C 21/20
USPC .................................................. 342/357.34
See application file for complete search history.

(56) References Cited

U.S. PATENT DOCUMENTS

| | | | | |
|---|---|---|---|---|
| 2014/0355461 | A1* | 12/2014 | Aldana | ............... H04L 43/0864 370/252 |
| 2017/0038215 | A1 | 2/2017 | Kotaki | |
| 2017/0225921 | A1* | 8/2017 | Scoville | .................. B66B 1/468 |
| 2018/0255434 | A1* | 9/2018 | Ivanov | ................... H04W 4/33 |

FOREIGN PATENT DOCUMENTS

| | | |
|---|---|---|
| JP | H11-304510 A | 11/1999 |
| JP | 2002-236444 A | 8/2002 |
| JP | 2003-177034 A | 6/2003 |
| JP | 2014-92463 A | 5/2014 |
| JP | 2014-173916 A | 9/2014 |
| JP | 2017032423 A | 2/2017 |
| WO | 2006/126343 A1 | 11/2006 |

OTHER PUBLICATIONS

JPO; Application No. 2017-053388; Notification of Reasons for Refusal dated Jan. 29, 2019.

* cited by examiner

*Primary Examiner* — Harry K Liu
(74) *Attorney, Agent, or Firm* — Fitch, Even, Tabin & Flannery LLP

(57) ABSTRACT

A position estimation apparatus includes a processor configured to perform control of acquiring a first relative elevation distribution which corresponds to a distribution of relative elevation in an area in a map, generating, based on pressure information acquired by the pressure information acquisition unit in a section where a user is in motion, a second relative elevation distribution which corresponds to a distribution of relative elevation in the section where the user is in motion, and estimating a current position in the area, based on similarity between the acquired first relative elevation distribution and the acquired second relative elevation distribution.

17 Claims, 12 Drawing Sheets

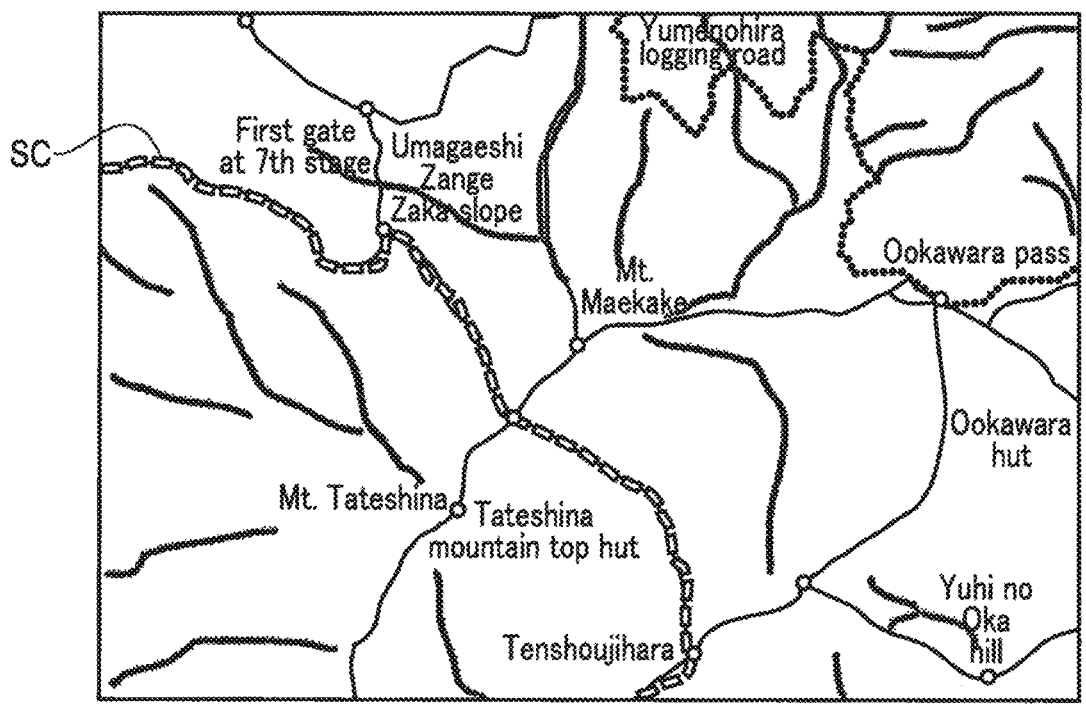
FIG. 2
Absolute elevation change of the course
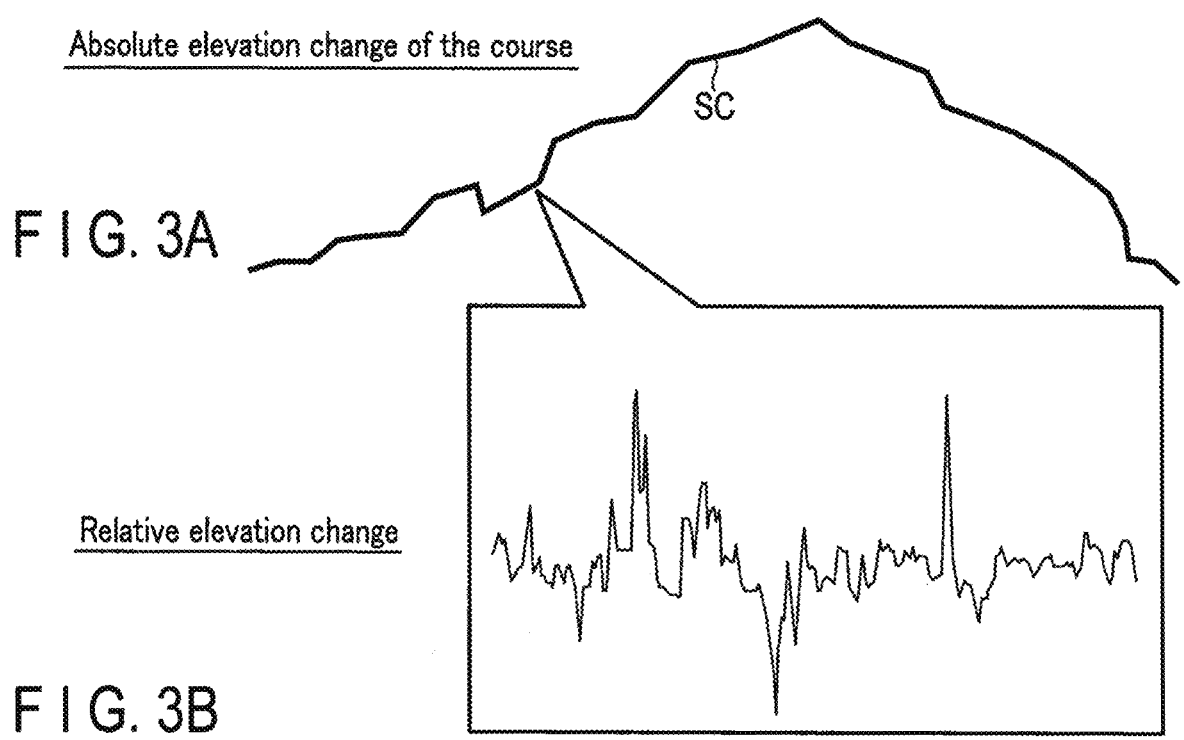
FIG. 3A
Relative elevation change
FIG. 3B Altitude data for planned course (n sections)

| i | 1 | 2 | 3 | 4 | ... | n+1 |
|---|---|---|---|---|---|---|
| Altitude: C | 850 | 870 | 860 | 890 | 930 | 990 |
| Relative elevation: dC | 0 | 20 | -10 | 30 | 40 | 60 |

Observed altitude data (n sections)

| | t-n | ... | t-3 | t-2 | t-1 | t |
|---|---|---|---|---|---|---|
| Altitude: V | 839 | 857 | 849 | 881 | 920 | 981 |
| Relative elevation: dV | 0 | 18 | -8 | 32 | 39 | 61 |

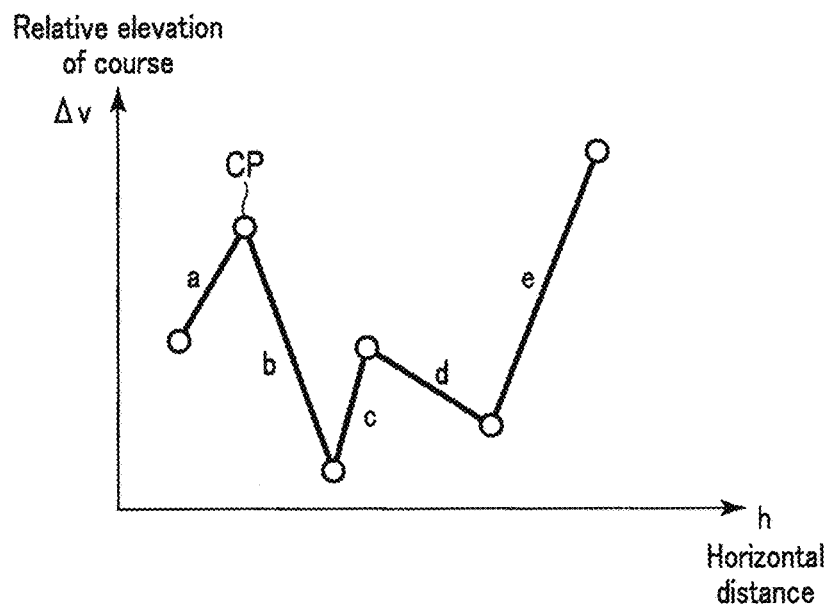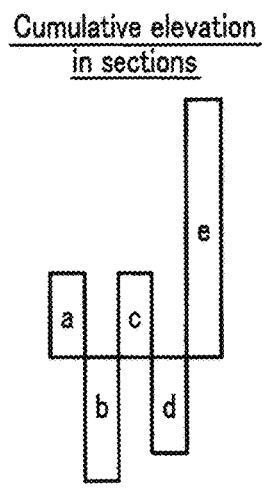
FIG. 8A    FIG. 8B
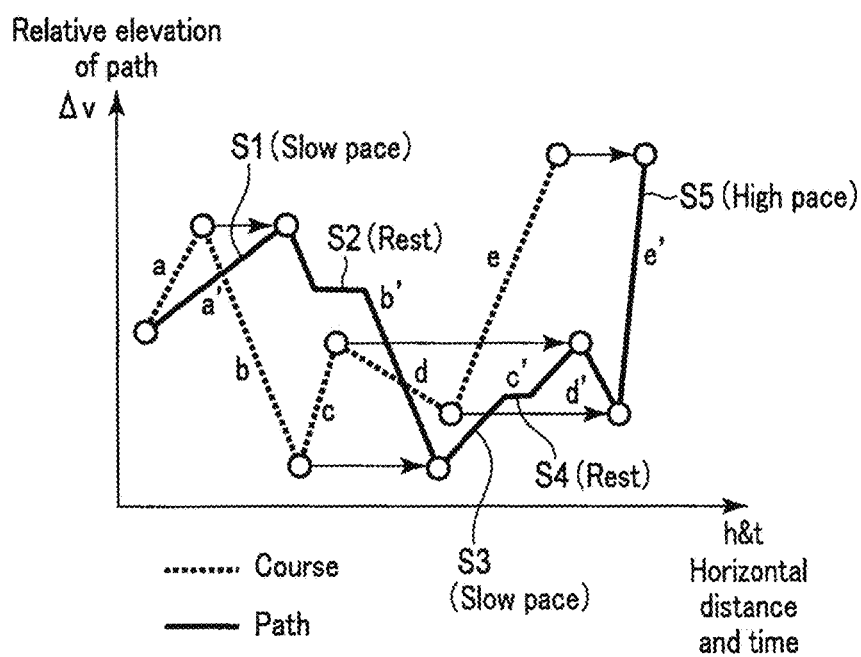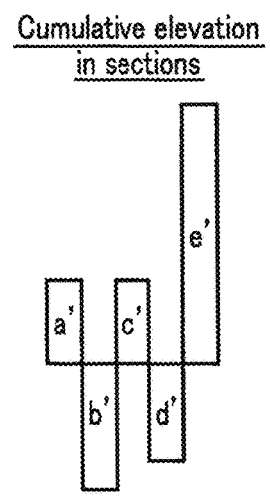
FIG. 9A    FIG. 9B

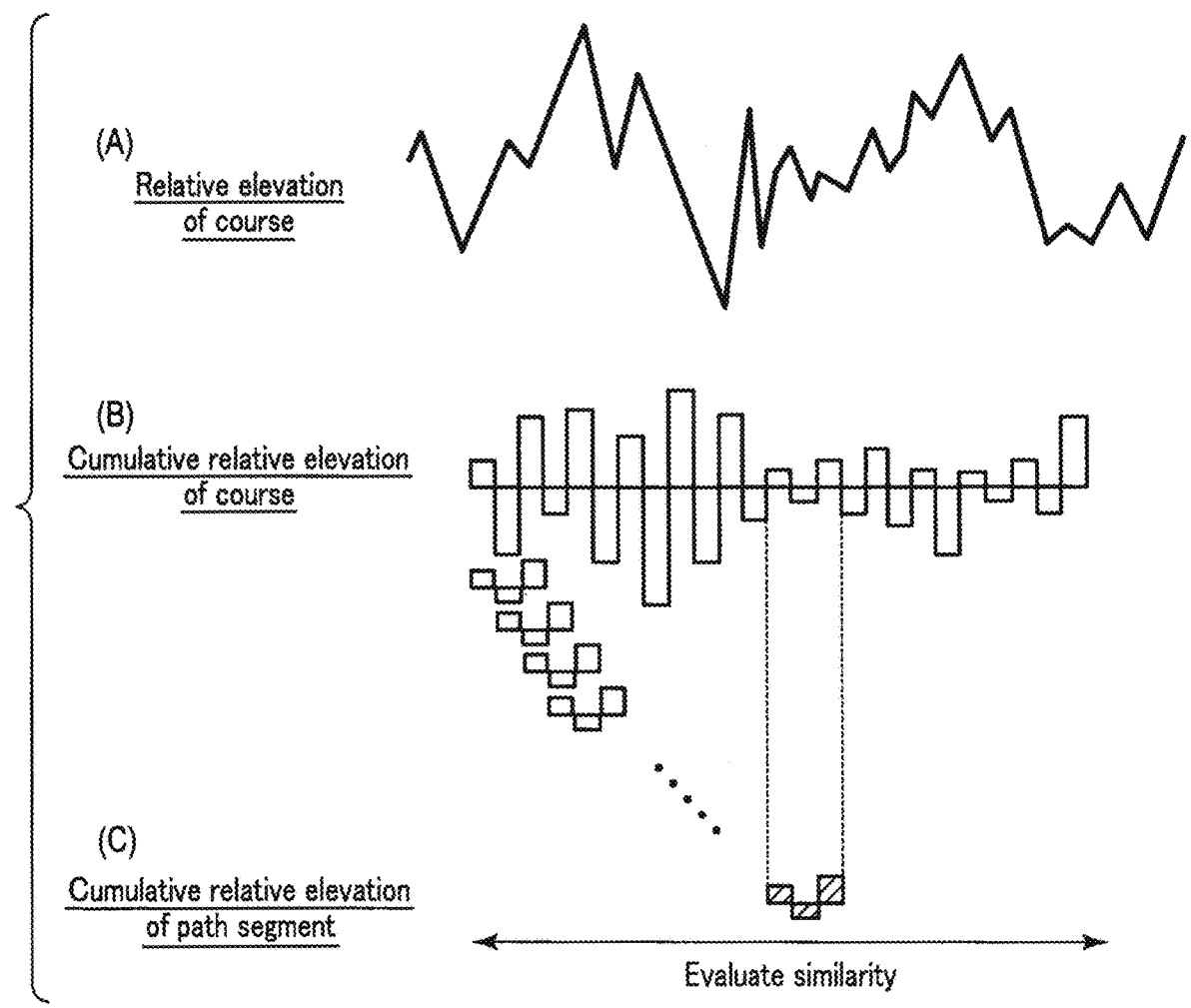
FIG. 10A Relative elevation of path segment 
FIG. 10B Cumulative relative elevation of path segment 
FIG. 11

(A) Altitude data for planned course (n sections)

| i | 1 | 2 | 3 | 4 | ... | n+1 |
|---|---|---|---|---|---|---|
| Altitude: C | 850 | 870 | 860 | 890 | 930 | 990 |
| Relative elevation: dC | 0 | 20 | −10 | 30 | 40 | 60 |

| | j | j+1 | J+m |
|---|---|---|---|
| Altitude: $\sigma C$ | 20 | −10 | 120 |

(B) Sign-reversed cumulative elevation

FIG. 14A  Relative elevation of path segment   
FIG. 14B  Relative elevation code   | 1,1,0,0,1,1,1,1 |
⟨Binary coding⟩
FIG. 15A  Relative elevation of path segment   
FIG. 15B  Relative elevation code   | U1,U1,D1,D1,U2,U2,U2,U2 |
⟨Symbol coding⟩

Altitude data for planned course (n sections)

| i | 1 | 2 | 3 | 4 | ... | n+1 |
|---|---|---|---|---|---|---|
| Altitude: C | 850 | 870 | 860 | 890 | 930 | 990 |
| Relative elevation: dC | 0 | 20 | -10 | 30 | 40 | 60 |
| Binary coding | - | 1 | 0 | 1 | 1 | 1 |
| Symbol coding | - | U2 | D1 | U3 | U4 | U5 |

F I G. 16A

Observed altitude data (n sections)

| | t-n | ... | t-3 | t-2 | t-1 | t |
|---|---|---|---|---|---|---|
| Altitude: V | 839 | 857 | 849 | 881 | 920 | 981 |
| Relative elevation: dV | 0 | 18 | -8 | 32 | 39 | 61 |
| Binary coding | - | 1 | 0 | 1 | 1 | 1 |
| Symbol coding | - | U2 | D1 | U4 | U4 | U6 |

F I G. 16B

Symbol coding conversion table

| | U1 | U2 | U3 | ... | D2 | D1 |
|---|---|---|---|---|---|---|
| Relative elevation | ~10 | ~20 | ~30 | ... | ~-20 | ~-10 |

F I G. 16C

F I G. 18A
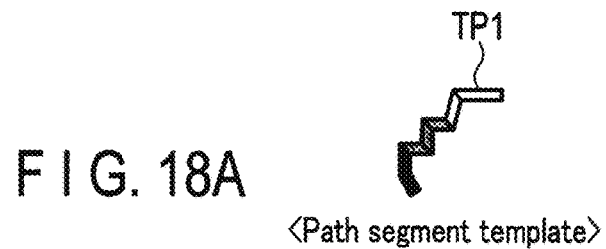
⟨Path segment template⟩
F I G. 18B
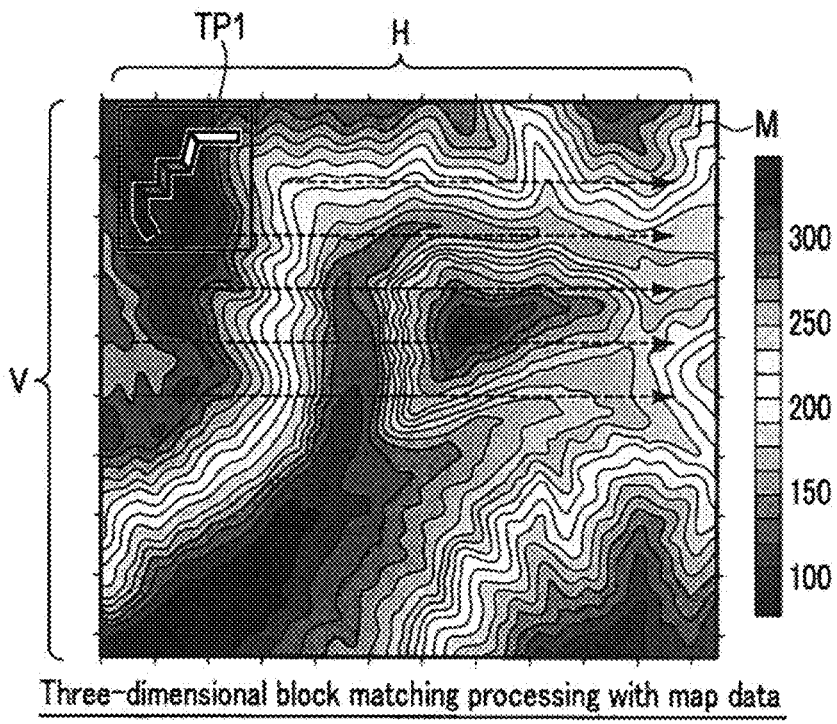
Three-dimensional block matching processing with map data
F I G. 18C
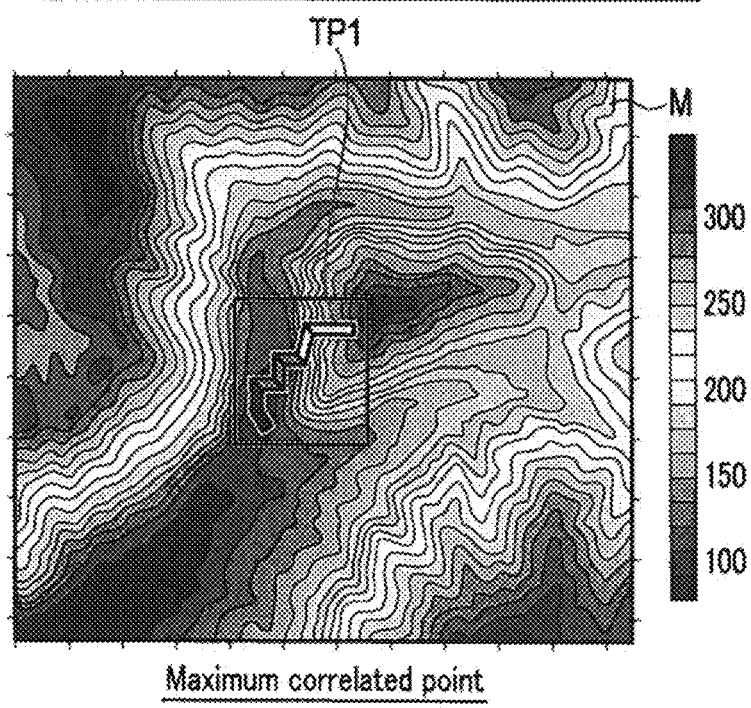
Maximum correlated point

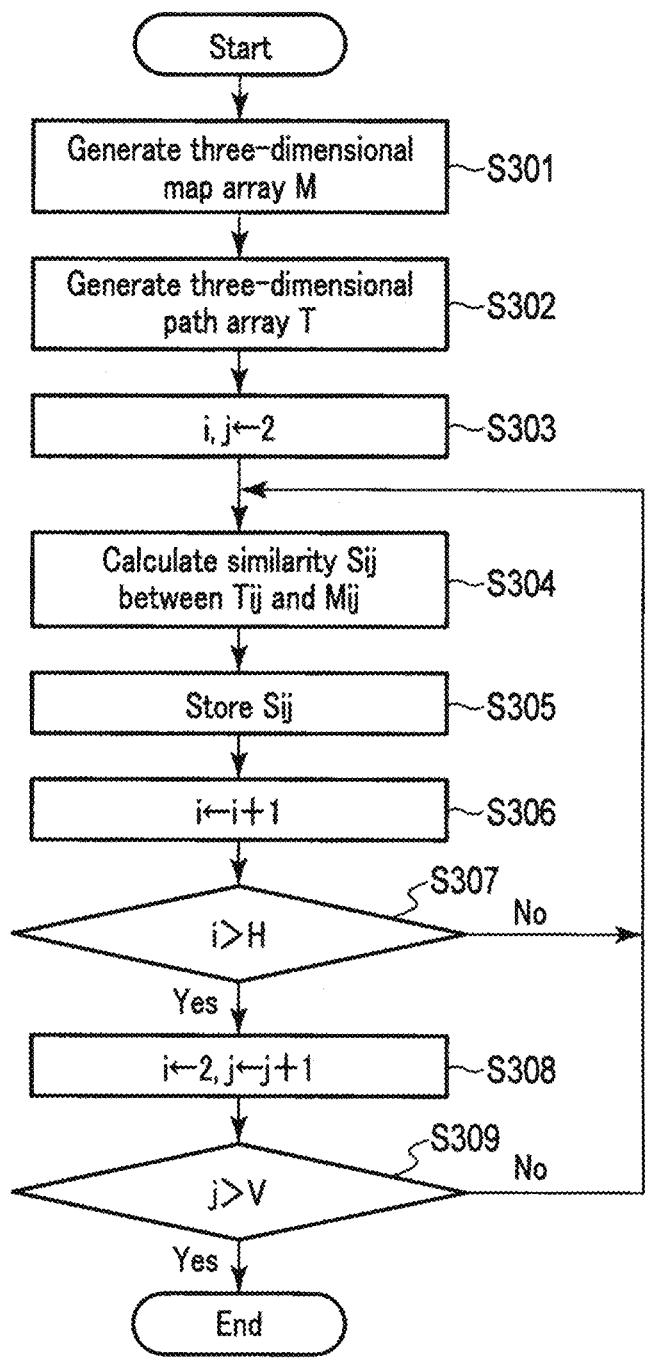
F I G. 19

POSITION ESTIMATION APPARATUS

CROSS-REFERENCE TO RELATED APPLICATIONS

This application is based upon and claims the benefit of priority from Japanese Patent Application No. 2017-053388, filed Mar. 17, 2017, the entire contents of which are incorporated herein by reference.

BACKGROUND OF THE INVENTION

1. Field of the Invention

The present invention relates to a position estimation apparatus.

2. Description of the Related Art

A technique relating to a map display system for allowing a user to accurately select a course using a combination of orientation information and direction information even when the user is on a mountain path or in a field for which node information is not set is known (e.g., see Jpn. Pat. Appln. KOKAI Publication No. 2014-092463).

SUMMARY OF THE INVENTION

According to one aspect of the present invention, there is provided a position estimation apparatus comprising: a pressure information acquisition unit that acquires pressure information; a processor; and a storage unit that stores a program to be executed by the processor, wherein the processor is configured to perform, by the program stored in the storage unit: relative elevation distribution acquisition processing for acquiring a first relative elevation distribution that is a distribution of relative elevation in an area in a map, relative elevation distribution generation processing for generating, based on pressure information acquired by the pressure information acquisition unit in a section where a user is in motion, a second relative elevation distribution which corresponds to a distribution of relative elevation in the section where the user is in motion, and position estimation processing for estimating a position of the section where the user is in motion in the area, based on similarity between the first relative elevation distribution acquired by the relative elevation distribution acquisition processing and the second relative elevation distribution acquired by the relative elevation distribution generation processing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing an example of climbing map data in a first operation example according to the embodiment;

FIG. 3A is a diagram showing one absolute elevation change in a climbing course in the climbing map data shown in FIG. 2 in the first operation example according to the embodiment;

FIG. 3B is a diagram showing part of a detailed relative elevation change in the climbing course in the climbing map data shown in FIG. 2 in the first operation example according to the embodiment;

FIG. 8A is a diagram showing an example of change in part of the relative elevation in the climbing course in a second operation example according to the embodiment;

FIG. 8B is a diagram showing a sectional cumulative elevation in the climbing course in the second operation example according to the embodiment;

FIG. 9A is a diagram showing an example of relative elevation change along with actual movement in the second operation example according to the embodiment;

FIG. 9B is a diagram showing an example of sectional cumulative elevation along with actual movement in the second operation example according to the embodiment;

FIG. 10A is a diagram showing an example of a relative elevation of a path segment along with movement in the second operation example according to the embodiment;

FIG. 10B is a diagram showing an example of a cumulative relative elevation along with movement in the second operation example according to the embodiment;

FIG. 11 is a diagram showing a relationship among a relative elevation change in the course in the second operation example according to the embodiment, corresponding cumulative relative elevation, and a current position obtained by similarity calculation;

FIG. 14A is a diagram showing an example of a relative elevation of a path segment along with movement in the third operation example according to the embodiment;

FIG. 14B is a diagram showing an example of binary-coded relative elevation along with movement in the third operation example according to the embodiment;

FIG. 15A is a diagram showing an example of a relative elevation of a path segment along with movement in the third operation example according to the embodiment;

FIG. 15B is a diagram showing an example of symbol-coded relative elevation along with movement in the third operation example according to the embodiment;

FIG. 16A is a diagram showing altitude data of the course in the third operation example according to the embodiment;

FIG. 16B is a diagram showing observed altitude data of the course in the third operation example according to the embodiment;

FIG. 16C is a diagram showing a conversion table for the symbol coding for the course in the third operation example according to the embodiment;

FIG. 18A is a diagram showing a path segment template in the fourth operation example according to the embodiment;

FIG. 18B is a diagram showing three-dimensional block matching processing for a path segment template on the map data in the fourth operation example according to the embodiment;

FIG. 18C is a diagram showing a maximum correlation point in the fourth operation example according to the embodiment; and FIG. 19 is a flowchart illustrating the processing for current position estimation in the fourth operation example according to the embodiment.

DETAILED DESCRIPTION OF THE INVENTION

An embodiment when the present invention is applied to a climbing navigation apparatus will be described in detail below with reference to the accompanying drawings.

[Structure]

Figure 1:
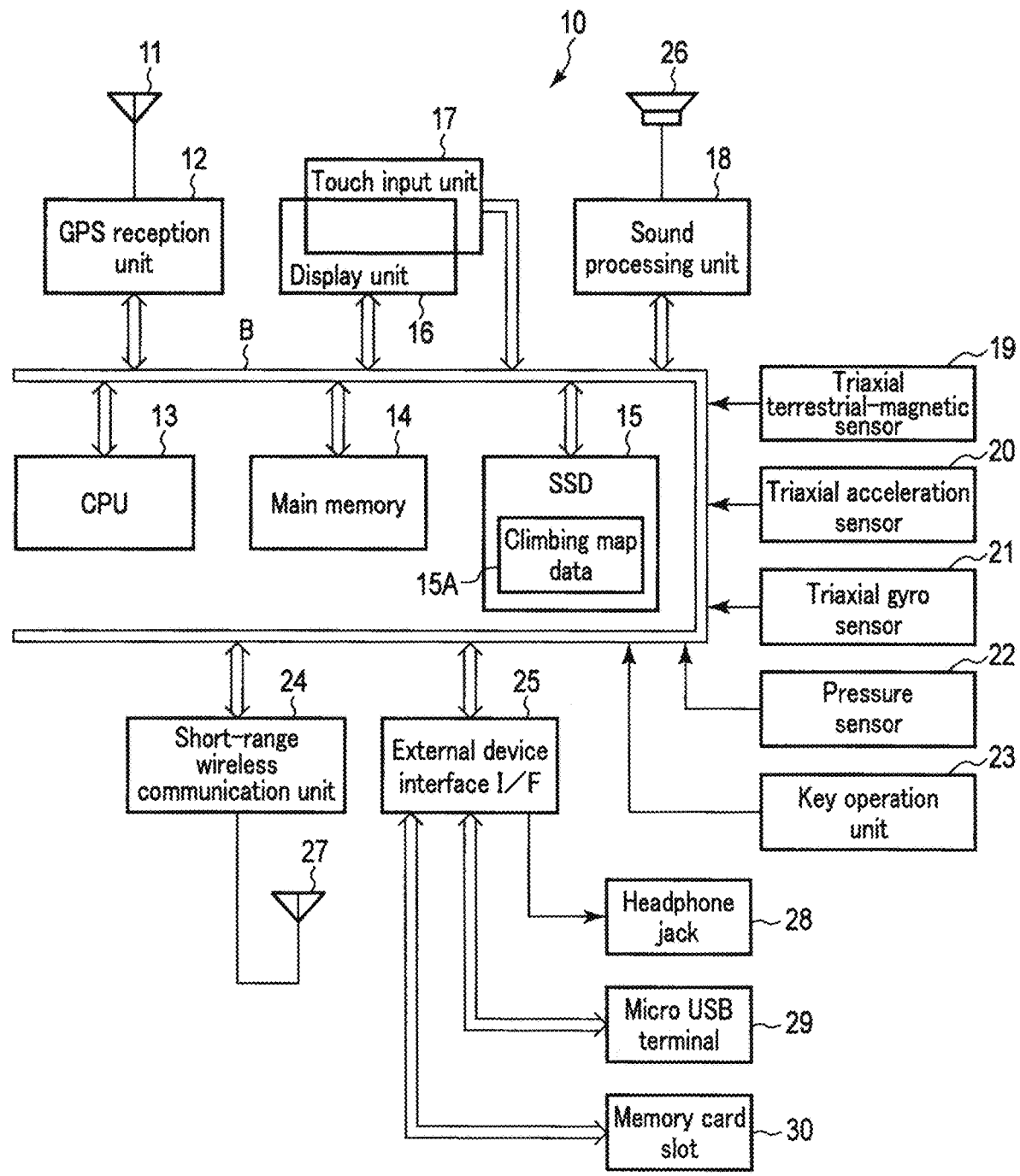
FIG. 1 is a block diagram showing the functional circuit arrangement of a climbing navigation apparatus according to an embodiment of the present invention.

FIG. 1 is a block diagram showing the functional circuit arrangement of the climbing navigation apparatus 10.

In the climbing navigation apparatus 10, based on incoming radio waves from at least four or more GPS (Global Positioning System) satellites (not shown), that are received by a GPS antenna 11, a GPS reception unit 12 calculates three dimensional coordinates of a current position, that is, a latitude, longitude, and altitude, and current time, and sends them to a CPU 13 via a bus B.

Note that the GPS antenna 11 and the GPS reception unit 12 may support a satellite positioning system other than the GPS, for example, GLONASS (GLObal NAvigation Satellite System) and QZSS (Quasi Zenith Satellite System) as a Japanese regional navigation satellite system to receive incoming radio waves from satellites and calculate the three dimensional coordinates of the current position and the current time with higher accuracy.

In this case, when it is described in the following explanation of an operation that GPS positioning is performed, it is assumed that a positioning operation by a satellite positioning system other than the GPS is also executed.

The CPU 13 controls the overall operation of the climbing navigation apparatus 10 using a main memory 14 and an SSD (Solid State Drive) 15 connected via the bus B.

The main memory 14 is formed by, for example, an SDRAM, and serves as a work memory when the CPU 13 executes a program. The SSD 15 is formed by a nonvolatile memory, and stores various operation programs necessary for a climbing route navigation operation, various permanent data including climbing map data 15A, and the like. The stored contents are loaded into the main memory 14 by the CPU 13 appropriately.

The climbing map data 15A stored in the SSD 15 is climbing topographic map data associated with the three dimensional coordinates of each point, and the topographic map data includes contour lines and climbing route information as road information.

The bus B is also connected to a display unit 16, a touch input unit 17, a sound processing unit 18, a triaxial terrestrial-magnetic sensor 19, a triaxial acceleration sensor 20, a triaxial gyro sensor 21, a pressure sensor 22, a key operation unit 23, a short-range wireless communication unit 24, and an external device interface (I/F) 25.

The display unit 16 is formed by a color liquid crystal panel with a backlight and a driving circuit therefor. The touch input unit 17 using a transparent electrode film is formed integrally with the display unit 16. The touch input unit 17 digitizes time series coordinate signals corresponding to a touch operation by the user, and sends the obtained signals as touch operation signals to the CPU 13.

The sound processing unit 18 includes a sound source circuit such as a PCM sound source, which generates an analog sound signal in accordance with provided sound data, and causes a speaker 26 to amplify the signal and emit it.

The triaxial terrestrial-magnetic sensor 19 is used to detect terrestrial magnetism in each of three axial directions orthogonal to each other, and can detect, based on the magnetic north direction, an orientation in which the climbing navigation apparatus 10 is made to face at this time.

The triaxial acceleration sensor 20 is used to detect acceleration in each of the three axial directions orthogonal to each other, and can detect the attitude of the climbing navigation apparatus 10 based on the direction of the gravitational acceleration.

The triaxial gyro sensor 21 is formed by an oscillation gyroscope arranged in the three axial directions orthogonal to each other, and is used to execute an operation of updating a current position by dead reckoning in cooperation with the triaxial terrestrial-magnetic sensor 19 and the triaxial acceleration sensor 20 by analyzing the operation of the user who holds or wears the climbing navigation apparatus 10 in combination with an output from the triaxial terrestrial-magnetic sensor 19 and an output from the triaxial acceleration sensor 20 even in a state in which a current position cannot be recognized based on outputs from the GPS antenna 11 and the GPS reception unit 12.

The pressure sensor 22 is used to detect a pressure at this time. Even if the GPS positioning by the GPS antenna 11 and the GPS reception unit 12 cannot be performed along with subsequent movement or the accuracy of the current position acquired by the positioning degrades, the pressure sensor 22 can relatively calculate elevation information of the current position from pressure information obtained at this time based on pressure information obtained at a position where the positioning accuracy is high by converting pressure information into elevation information based on elevation information obtained when the positioning accuracy of the current position by the GPS antenna 11 and the GPS reception unit 12 is high.

The key operation unit 23 is formed by a power key, current position key, destination key, cursor key, enter key, and the like, all of which are provided in the housing of the climbing navigation apparatus 10, and sends, to the CPU 13 via the bus B, a key operation signal corresponding to a key operation for each of the keys.

By, for example, Bluetooth (registered trademark) SMART or ANT+, the short-range wireless communication unit 24 is wirelessly connected, via a short-range wireless communication antenna 27, to an external apparatus for which a pairing setting has been made in advance.

The external device interface 25 allows, for example, headphones or earphones, a USB device, and a memory card to be connected or attached via a headphone jack 28, a micro USB terminal 29, and a memory card slot 30, respectively.

First Operation Example

In the present operation example, suppose the user having the climbing navigation apparatus 10 is walking along a climbing course SC indicated by the dashed line in the climbing map as shown in FIG. 2.

As shown in FIG. 2, the climbing map has three-dimensional coordinate information which includes altitude information for each point, and an absolute elevation change in the climbing course SC can be obtained from the course SC, as shown in FIG. 3A where the horizontal axis represents a moved distance in a horizontal direction and the vertical axis represent an altitude.

By converting the elevation at a starting point in the course to zero based on this absolute elevation change, detailed relative elevation change as shown in FIG. 3B can be obtained.

When a position is actually displayed, based on the detailed relative elevation change shown in FIG. 3B, a relative elevation change in a path segment corresponding to a movement of the user having the climbing navigation apparatus 10 over a predetermined immediately preceding period of time, for example ten minutes is obtained, and an extent of similarity is calculated.

Figure 4:
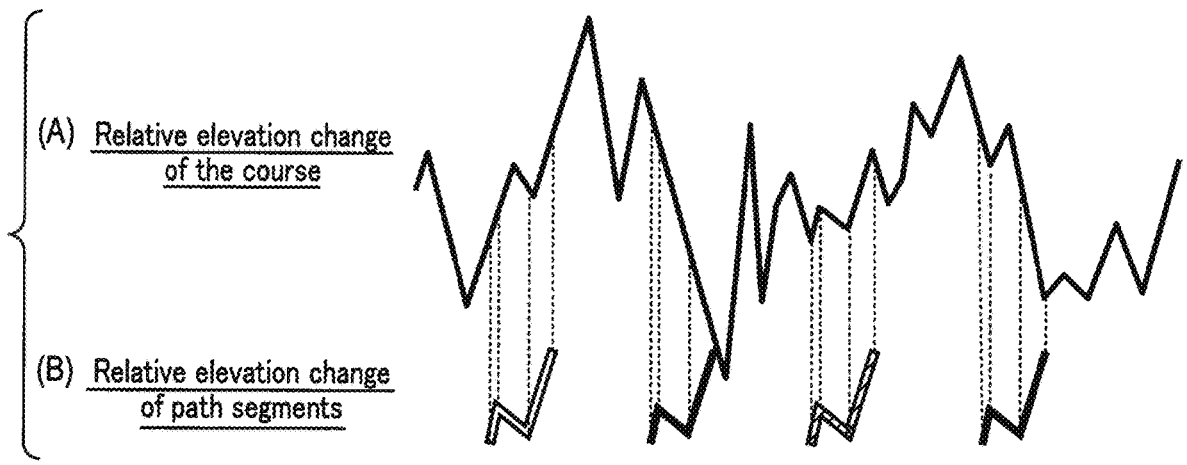
FIG. 4 is a diagram showing a comparison between a relative elevation change and relative elevation change of path segments in the climbing course in the first operation example according to the embodiment.

FIG. 4 is a diagram showing a comparison between (A) relative elevation change corresponding to the climbing course SC and (B) relative elevation change in the path segments. In FIG. 4, (B) indicates a state of comparing the path segments having a shape of "N" with parts in the relative elevation change of the course indicated by (A). In this comparison process, similarity is calculated using a predetermined computing expression, and a portion which has highest similarity in the course as a current position is specified.

Figure 5:
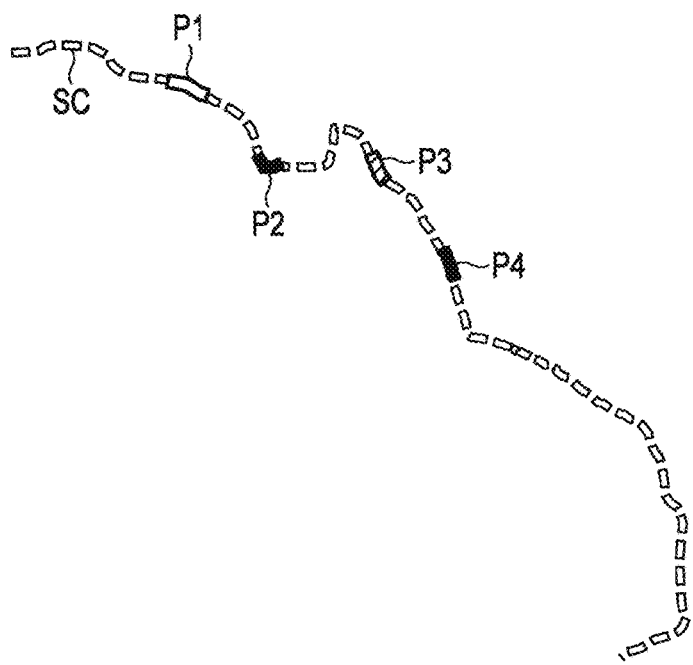
FIG. 5 is a diagram showing sections corresponding to the path segments on the actual climbing course in correspondence with FIG. 4 in the first operation example according to the embodiment.

FIG. 5 indicates sections P1 to P4, which correspond to the path segments, on the actual climbing course SC in FIG. 4. Herein, suppose that the section P3 has highest similarity and is determined to be a first candidate for a current position, and the section P1 is the second candidate with second-highest similarity.

Next, processing performed by the CPU 13 for determining a current position based on the altitude data for all n sections on the course and altitude data that is actually observed by the user having the climbing navigation apparatus 10, will be described.

Figures 6A, 6B, 7:
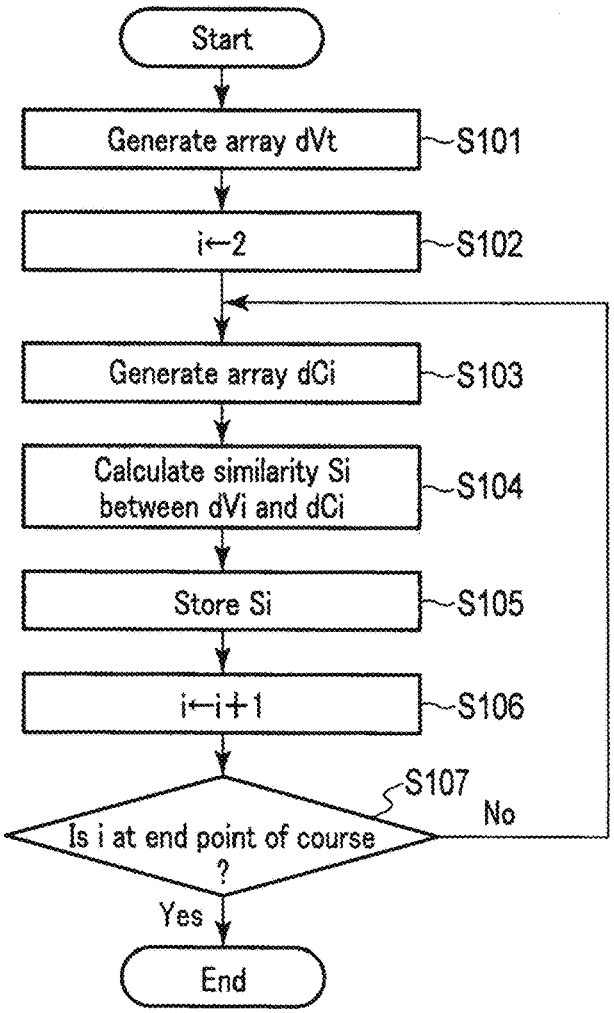
FIG. 6A is a diagram showing altitude data of the course in the first operation example according to the embodiment.
FIG. 6B is a diagram showing observed altitude data of the course in the first operation example according to the embodiment.
FIG. 7 is a flowchart illustrating the processing for current position estimation in the first operation example according to the embodiment.

FIG. 6A is a diagram showing the altitude data C for all n+1 points on the course and a relative elevation dC at each point, where dC at the course starting point (I=1) is defined as zero.

In contrast, FIG. 6B is a diagram showing the altitude data V observed by the user having the climbing navigation apparatus 10 at n+1 points in total at observation timing "t−n" to "t", and each relative elevation dV when dV at the course starting point is defined as zero.

In the process of observation as shown in FIG. 6B, processing shown in FIG. 7 is performed in the climbing navigation apparatus 10 as needed.

FIG. 7 is a flowchart indicating the processing for current position estimation based on a detection output by the pressure sensor 22. The processing is performed as needed by the CPU 13 of the climbing navigation apparatus 10 after the user has left the starting point of the course SC, and is performed in parallel with positioning of an absolute current position by the GPS antenna 11 and the GPS reception unit 12.

This processing is executed when the CPU 13 reads the operation programs, the climbing map data 15A, etc., stored in the SSD 15, and engages and stores them in the main memory 14. The processing is executed once in a time cycle preset by the user, for example, every 60 seconds.

At the beginning of the processing, the CPU 13 generates a path segment indicated by a relative elevation array dVt, like the one indicated by (B) of FIG. 4, for a predetermined length of time that immediately precedes the current time, for example ten minutes, based on current timing t (step S101).

Next, the CPU 13 sets an initial value "2" to the variable i that indicates a point on the climbing course SC (step S102). The CPU 13 generates, based on the variable i, a relative elevation array dCi on the course for a predetermined immediately-preceding horizontal distance, which starts from the point i, with a sufficient leeway with respect to the above-mentioned predetermined length of time (step S103).

Herein, the CPU 13 calculates similarity Si between the generated relative elevation array dVt and relative elevation array dCi, using a predetermined computation expression (step S104).

A computation expression used herein may be a sum of squared difference method; however, in consideration of time warping due to variations in moving speed among users of the climbing navigation apparatus 10, a time warping method, such as DTW (dynamic time warping), seems more suitable.

The similarity Si calculated in step S104, which is presumed to correspond to the point i, is stored in the main memory 14 (step S105), and the value of the variable i is updated to "+1" so as to calculate similarity in a next point (step S106).

It is determined whether or not the updated variable i at the point exceeds the end point of the course, more specifically, if the course has n sections as shown in FIG. 6A, whether the updated variable i becomes "n+2" which exceeds the final point "n+1" on the course is determined (step S107).

Herein, if it is determined that the variable has not yet exceeded the end point of the course ("No" in step S107), the CPU 13 returns to the processing in step S103 and continues the same processing.

Thus, the processing from step S103 to step S107 is repeatedly performed, and similarity Si based on the variable i at a time is successively stored in the main memory 14.

In step S107, when it is determined that the variable i reaches the end point on the climbing course SC ("Yes" in step S107), the CPU 13 finishes the processing shown in FIG. 7, and specifies the point having the highest similarity among the similarity values stored in the main memory 14 as a current position, and displays the current position at the point on the climbing course SC displayed on the display unit 16.

Unlike the foregoing, the process of specifying the current position is not necessarily unique processing achieved by detecting a relative elevation based on an output from the pressure sensor 22; the current position may be used as one of indexes that are provided to a next stage of the positioning, including other factors in absolute positioning performed by the GPS antenna 11 and the GPS reception unit 12.

In this case, the position estimation is performed without using the GPS positioning by the GPS antenna 11 and the GPS reception unit 12 on purpose; thus, it is possible to improve robustness of the climbing navigation apparatus 10 against pressure change that occurs when relative elevation is detected from pressure information that is output from the pressure sensor 22 and for error factors, such as errors at a horizontal position.

Conversely, the climbing course SC that is read from the climbing map data 15A can be adjusted with respect to the scale in the horizontal distance direction by normalizing the relative elevation data of the path segments obtained by moving the climbing navigation apparatus 10, using a duration of movement and a length of elapsed time.

By this processing, compared to the processing without considering the scale in the horizontal direction, the robustness can be improved, and current position estimation can be more accurately performed.

According to the present operation example as described above in detail, it is possible to accurately identify a current position, even when GPS positioning cannot be performed.

In the above-described operation example, the relative elevation distribution along with the climbing course SC in the climbing data of an area that is read from the climbing map data 15A is generated; thus, an amount of calculation can be significantly reduced for a case where a course is known in advance, thereby reducing a load of computing processing by the CPU 13, and reducing electricity consumption when the climbing navigation apparatus 10 is operated by a battery with a limited power capacity.

Second Operation Example

In the present operation example, a case where position estimation is performed when the climbing navigation apparatus 10 is in motion, with purposely excluding a component of distance in the horizontal direction of the climbing course SC in the climbing map explained in FIG. 2, will be explained.

FIG. 8A is a diagram showing the ups and downs during the movement on part of the climbing course SC, where the horizontal axis represents a horizontal distance h, and the vertical axis represents a relative elevation $\Delta v$ of the course. In FIG. 8A, the start/end points and the points where the up/down changes are indicated by circles CP. FIG. 8B shows cumulative elevation in the course sections "a" to "e", which is calculated by simply accumulating the ups and downs in each section.

Suppose if the user having the climbing navigation apparatus 10 actually moves along the climbing course SC, the path of the movement that is actually obtained may be greatly different from what is shown in FIG. 8A because of a variety of factors, such as skills and physical fitness of the user as a climber, physical conditions and weather of the day, and the like.

FIG. 9A is a drawing showing the ups/downs in the movement on part of the climbing course SC shown in FIG. 8A, where the horizontal axis represents a horizontal distance h and time t, and the vertical axis represents a relative elevation $\Delta v$ of the path.

In FIG. 9A, the actual path in the course section a' extends with respect to the horizontal axis, compared to the path in the course section a, as indicated by "S1 slow pace".

Differing from the course section b, the course section b' includes a part where the relative elevation does not change because of a rest S2. Differing from the course section c, the course section c' includes a slow-pace part S3 and a rest S4.

Differing from the course section e, the user moves at a fast pace S5 in the course section e' to catch up.

However, if the component of the horizontal axis is excluded, and the cumulative elevation in each of the course sections a' to e' is calculated by simply accumulating the ups and downs in each section, information similar to that in FIG. 8B will be calculated, as shown in FIG. 9B.

Based on this concept, the components of the horizontal distance and time are excluded in the present operation example to simplify a path segment only with the ups and downs in each section.

FIGS. 10A and 10B are drawings for explaining how a position is actually estimated using the concept. For example, if the relative elevation of a path segment as a result of a movement shows a shape of up-down-up, like the one shown in FIG. 10A, the relative elevation can be denoted in the form of cumulative relative elevation as shown in FIG. 10B.

When reversing the signs of the ups and downs, linear or non-linear smoothing may be performed as pre-processing to avoid minor influences due to the sign reversing.

In FIG. 11, (A) indicates an example of a relative elevation change in the same course as the course indicated by (A) of FIG. 4, and in FIG. 11, (B) indicates the relative elevation change denoted in the form of the cumulative relative elevation.

Thus, the cumulative elevation change of the path segment shown in FIG. 10B is retrieved from the cumulative elevation change indicated by (B) of FIG. 11, while similarity is calculated by matching processing, thereby estimating a current position with a significantly small amount of computing, as indicated by (C) of FIG. 11.

When calculating similarity, the following expression is used:

$$\text{Similarity} = \sum_{\in S} (f(C_R, T_R) + k(C_A - T_A)) \quad (1)$$

where,
  f: relative function
  $C_R$: course cumulative relative elevation
  $T_R$: path segment cumulative relative elevation
  S: path segment
  k: absolute elevation coefficient
  $C_A$: course absolute elevation
  $T_A$: path segment absolute elevation In the expression (1), the relative function f in the first term of the bracket on the right side is used. As in the second term of the same bracket, more suitable similarity can be obtained by taking a product of an absolute elevation difference between the course and the path segments and a predetermined coefficient into consideration.

Next, processing performed by the CPU 13 for determining a current position based on the altitude data for all n sections on the course and altitude data that is actually observed by the user having the climbing navigation apparatus 10, will be described.

Figures 12, 13:
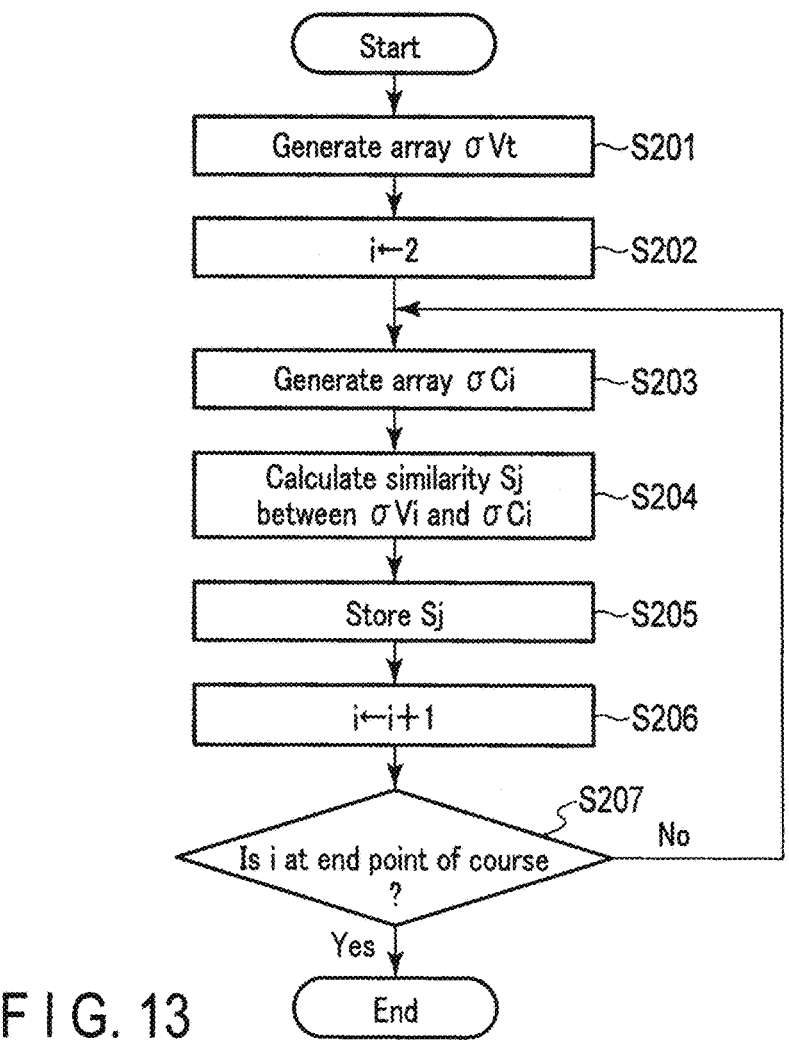
FIG. 12 is a diagram showing altitude data of the course in the second operation example according to the embodiment and the sign-reversed cumulative elevation.
FIG. 13 is a flowchart illustrating the processing for current position estimation in the second operation example according to the embodiment.

In FIG. 12, (A) indicates an example of altitude data C for all n+1 points on the course and a relative altitude dC at each point where dC at the course starting point (i=1) is defined as zero.

In FIG. 12, (B) indicates an example of cumulative elevation σC in the sections j to j+m, which are segmented by the sign-reversing points corresponding to the ups and downs.

FIG. 13 is a flowchart indicating the processing for current position estimation based on a detection output by the pressure sensor 22. The processing is performed as needed by the CPU 13 of the climbing navigation apparatus 10 after the user has left the starting point of the course SC, and is performed in parallel with positioning of an absolute current position by the GPS antenna 11 and the GPS reception unit 12.

This processing is executed when the CPU 13 reads the operation programs, the climbing map data 15A, etc., stored in the SSD 15, and engages and stores them in the main memory 14. The processing is executed once in a time cycle preset by the user, for example, every 60 seconds.

At the beginning of the processing, the CPU 13 generates a path segment indicated by a sign-reversed cumulative elevation array σVt, like the one shown in FIG. 10B, for a predetermined length of time that immediately precedes current time, for example ten minutes, based on current timing t (step S201).

Next, the CPU 13 sets an initial value "2" to the variable i that indicates a point on the climbing course SC (step S202). The CPU 13 generates, based on the variable i, a sign-reversed cumulative elevation array σCi on the course for a predetermined immediately-preceding horizontal distance, which starts from the point i, with a sufficient leeway with respect to the above-mentioned predetermined length of time (step S203).

Herein, the CPU 13 calculates similarity Sj between the generated sign-reversed cumulative elevation array σVt and sign-reversed cumulative elevation array σCi, using, for example, the expression (1) (step S204).

The similarity Sj calculated in step S204, which is presumed to correspond to the point i, is stored in the main memory 14 (step S205), and the value of the variable i is updated to "+1" so as to calculate similarity in a next point (step S206).

It is determined whether or not the updated variable i at the point exceeds the end point of the course, more specifically, whether the updated variable i becomes "n+2" which exceeds the final point "n+1" on the course if the course has n sections as indicated by (A) of FIG. 12 (step S207).

Herein, if it is determined that the variable has not yet exceeded the end point of the course ("No" in step S207), the CPU 13 returns to the processing in step S203 and continues the same processing.

Thus, the processing from step S203 to step S207 is repeatedly performed, and similarity Sj based on the variable i at a time is successively stored in the main memory 14.

In step S207, when it is determined that the variable i reaches the end point on the climbing course SC ("Yes" in step S207), the CPU 13 finishes the processing shown in FIG. 13, and specifies the point having the highest similarity among the similarity values stored in the main memory 14 as a current position, and displays the current position at the point on the climbing course SC displayed on the display unit 16.

Unlike the foregoing, the process of specifying the current position is not necessarily unique processing achieved by detecting a relative elevation based on an output from the pressure sensor 22; the current position may be used as one of indexes that are provided to a next stage of the positioning, including other factors in absolute positioning performed by the GPS antenna 11 and the GPS reception unit 12.

As described above, the distance in the horizontal direction and the duration of the movement when the user having the climbing navigation apparatus 10 is in motion are excluded to calculate similarity using distribution of a relative elevation change in the present operation example; thus, computing processing can be greatly simplified, thereby reducing a load on the processing at the CPU 13 and estimating a current position in a shorter time.

Third Operation Example

In the present operation example, the concept of the second operation example is further extended. A case where position estimation is performed when the climbing navigation apparatus 10 is in motion, excluding a component of distance in the horizontal direction from the climbing course SC in the climbing map explained with reference to FIG. 2, and coding the climbing course SC, taking slopes into consideration, will be explained.

FIGS. 14A and 14B are drawings for explaining how a position is actually estimated using the above concept. If the relative elevation of a path segment corresponding to a movement has a shape of "N" indicating up-down-up, for example, as shown in FIG. 14A, the relative elevation is binary-coded into "1, 1, 0, 0, 1, 1, 1", where "up" is coded "1" and "down" is coded "0", as shown in FIG. 14B.

Instead of such binary coding, as shown in FIGS. 15A and 15B, a relative elevation code, "U1, U1, D1, D1, U2, U2, U2", may be obtained by symbol-coding the relative elevation, where the code "1 (=up)" which means a rise of slope may be coded U1 (up to +10 m), U2 (up to +20 m), or U3 (up to +30 m) in accordance with an extent of change, and the code "0 (=down)" which means a decline of slope may be similarly coded D1 (up to −10 m), D2 (up to −20 m), or D3 (up to −30 m).

Thus, after replacing the relative elevation change in the entire course with a relative elevation code obtained by binary coding or symbol coding, and replacing the relative elevation change of a path segment corresponding to an actual movement with a relative elevation code obtained by binary coding or symbol coding, the replaced relative elevation changes are retrieved, while similarity is calculated by matching processing, thereby estimating a current position with a significantly small amount of computing.

Next, processing performed by the CPU 13 for determining a current position based on the altitude data for all n sections on the course and altitude data that is actually observed by the user having the climbing navigation apparatus 10, will be described.

FIG. 16A is a diagram showing the altitude data C for all n+1 points on the course, a relative elevation dC at each point when dC at the course starting point where dC at the course starting point (i=1) is defined as zero, binary coding, and symbol coding.

In contrast, FIG. 16B is a drawing showing the altitude data V at all n+1 points on the course, which is observed as the user actually walks on the course, the relative elevation dC at each point when dC at the course starting point "t−n" is defined as zero, the binary code, and the symbol code.

FIG. 16C is conversion table for obtaining the above-explained symbol codes from a relative elevation.

Figure 17:
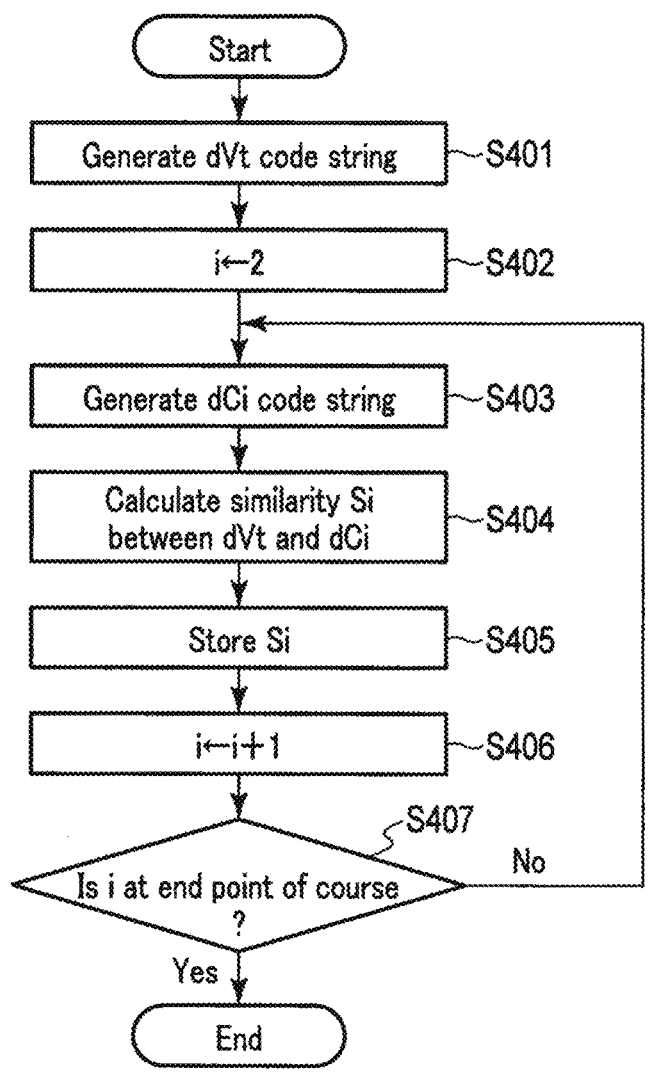
FIG. 17 is a flowchart illustrating the processing for current position estimation in the third operation example according to the embodiment.

FIG. 17 is a flowchart indicating the processing for current position estimation based on a detection output by the pressure sensor 22. The processing is performed as needed by the CPU 13 of the climbing navigation apparatus 10 after the user has left the starting point of the course SC, and is performed in parallel with positioning of an absolute current position by the GPS antenna 11 and the GPS reception unit 12.

This processing is executed when the CPU 13 reads the operation programs, the climbing map data 15A, etc., stored in the SSD 15, and engages and stores them in the main memory 14. The processing is executed once in a time cycle preset by the user, for example, every 60 seconds.

At the beginning of the processing, the CPU 13 generates a path segment indicated by an array of symbol codes corresponding to a relative elevation array dVt, like the one shown in FIG. 16B, for a predetermined length of time that immediately precedes the current time, for example ten minutes, based on current timing t (step S401).

Next, the CPU 13 sets an initial value "2" to the variable i that indicates a point on the climbing course SC (step S402). The CPU 13 generates, based on the variable i, an array of symbol codes corresponding to a relative elevation array dCi on the course for a predetermined immediately-preceding horizontal distance, which starts from the point i, with a sufficient leeway with respect to the above-mentioned predetermined length of time (step S403).

Herein, the CPU 13 calculates similarity Si between a code string of the generated elevation array σVt and a code string of the relative elevation array dCi (step S404).

The similarity Si can be calculated using, for example, a Hamming distance and an edit distance (Levenshtein distance).

The similarity Si calculated in step S404, which is presumed to correspond to the point i, is stored in the main memory 14 (step S405), and the value of the variable i is updated to "+1" so as to calculate similarity in a next point (step S406).

It is determined whether or not the updated variable i at the point exceeds the end point of the course, more specifically, whether the updated variable i becomes "n+2" which exceeds the final point "n+1" on the course if the course has n sections as shown in FIG. 16A (step S407).

Herein, if it is determined that the variable has not yet exceeded the end point of the course ("No" in step S407), the CPU 13 returns to the processing in step S403 and continues the same processing.

Thus, the processing from step S403 to step S407 is repeatedly performed, and similarity Si based on the variable i at a time is successively stored in the main memory 14.

In step S407, when it is determined that the variable i reaches the end point on the climbing course SC ("Yes" in step S407), the CPU 13 finishes the processing shown in FIG. 17, and specifies the point having the highest similarity among the similarity values stored in the main memory 14 as a current position, and displays the current position at the point on the climbing course SC displayed on the display unit 16.

Unlike the foregoing, the process of specifying the current position is not necessarily unique processing achieved by detecting a relative elevation based on an output from the pressure sensor 22; the current position may be used as one of indexes that are provided to a next stage of the positioning, including other factors in absolute positioning performed by the GPS antenna 11 and the GPS reception unit 12.

As described above, the distance in the horizontal direction and the duration of the movement when the user having the climbing navigation apparatus 10 is in motion are excluded to calculate similarity using distribution of a symbol-coded relative elevation change in the present operation example; thus, computing processing can be greatly simplified, thereby reducing a load on the processing at the CPU 13 and estimating a current position in a shorter time.

In the above-described embodiment, the climbing navigation apparatus 10 generates a relative elevation change from a climbing map including altitude information; however, the present invention is not limited thereto. A relative elevation change may be generated by an external PC, and data of the generated relative elevation change may be used by the climbing navigation apparatus 10.

Fourth Operation Example

In the present operation example, a case where a position estimation is performed on map data expressed with three-dimensional information, using a path segment based on a three-dimensional coordinate array depending on movement on a climbing course which is known in advance, not two-dimensional position estimation using a relative estimation with respect to a horizontal distance and a duration of the movement, will be explained.

FIGS. 18A, 18B, and 18C are drawings showing the relationship between a three-dimensional path array and a three-dimensional map array. A movement path array is generated by an dead reckoning method in a three-dimensional space based on the detected output from the triaxial terrestrial-magnetic sensor 19, the triaxial acceleration sensor 20, and the triaxial gyro sensor 21 in addition to the relative elevation information which is obtained by the pressure sensor 22 when the user having the climbing navigation apparatus 10 is in motion, using an air pressure at the climbing course entrance as a reference at the beginning.

FIG. 18A shows a path segment template TP1 of the three-dimensional path array generated based on the relative elevation information, three-dimensional terrestrial magnetism information for a predetermined length of time, for example, the last ten minutes that immediately precedes the current time, and three-dimensional movement path.

Herein, an absolute orientation of the moving direction can be specified by using the three-dimensional terrestrial magnetism information. For this reason, when performing pattern-block matching processing, which will be later described, it is possible to omit rotating the path segment template TP1 within the range of 360 degrees along the horizontal plane and calculating similarity for the three-dimensional map array in each orientation angle, thereby greatly reducing an amount of computing in the main memory 14.

FIG. 18B is a drawing showing a process of performing pattern-block matching processing along the horizontal plane for the path segment template TP1 in a raster scanning manner in the three-dimensional map array M generated based on the relative elevation information. As shown in FIG. 18B, a two-dimensional coordinate range along the horizontal plane in the three-dimensional space is expressed by H (e.g., an East-West direction) and V (e.g., a North-South direction).

FIG. 18C is a drawing showing a case where the path segment template TP1 is fitted to the position which is determined to have the highest similarity as a result of the pattern-block matching processing performed for the path segment template TP1 in the three-dimensional map array M.

FIG. 19 is a flowchart indicating the processing for current position estimation based on detection outputs by the triaxial terrestrial-magnetic sensor 19, the triaxial acceleration sensor 20, and the pressure sensor 22. The processing is performed as needed by the CPU 13 of the climbing navigation apparatus 10 while the user is moving in an area in the map data shown in FIG. 18B, and is performed in parallel with positioning of an absolute current position by the GPS antenna 11 and the GPS reception unit 12.

This processing is executed when the CPU 13 reads the operation programs, the climbing map data 15A, etc., stored in the SSD 15, and engages and stores them in the main memory 14. The processing is executed once in a time cycle preset by the user, for example, every 60 seconds.

At the beginning of the processing, the CPU 13 reads map data of a predetermined area which includes a current position from the climbing map data 15A, and generates a three-dimensional map array M that shows a terrestrial surface shape in the three-dimensional space (step S301).

Subsequently, the CPU 13 generates a three-dimensional path array T, like the path segment template TP1 shown in FIG. 18A, for a predetermined length of time that immediately precedes the current time, for example, ten minutes (step S302).

Subsequently, the CPU 13 sets an initial value "2" to each of the variables i and j that indicate a two-dimensional coordinate point on the horizontal plane in the map array (step S303). The CPU 13 calculates similarity Sj between the three-dimensional path array Tij and the three-dimensional map array Mij in the point coordinate (i,j) based on the variables i and j at a time by performing a computation (step S304).

For the computing of similarity herein, Monte Carlo Localization for determining probability distribution using particles, for example, may be used.

The similarity Sij calculated in step S304, which is presumed to correspond to the point coordinate (i,j), is stored in the main memory 14 (step S305), and the value of the variable i is updated to "+1" so as to calculate similarity in a next point (step S306).

It is determined whether or not the updated coordinate variable i exceeds the end point H which indicates the horizontal direction of the map range shown in FIG. 18B (step S307).

Herein, if it is determined that the variable i has not yet exceeded the end point H in the map range ("No" in step S307), the CPU 13 returns to the processing in step S303 and continues the same processing.

Thus, the processing from step S303 to step S307 is repeatedly performed, and similarity Sij along a scan line corresponding to the variable j is successively stored in the main memory 14.

In step S307, when it is determined that the coordinate variable i exceeds the end point H ("Yes" in step S307), in order to update the coordinate in the vertical direction of the scan line, an initial value "2" is set to the coordinate variable i, and the coordinate variable j is updated to "+1" (step S308).

Herein, it is determined whether or not the updated coordinate variable j exceeds the other end point V which indicates the vertical direction of the map range shown in FIG. 18B (step S309).

Herein, if it is determined that the variable j has not yet exceeded the other end point V in the map range ("No" in step S309), the CPU 13 returns to the processing in step S303 and continues the same processing.

Thus, the processing from step S303 to step S309 is repeatedly performed as needed, and similarity Sij is successively stored in the main memory 14 by scanning the entire map range in a Raster scan manner.

In step S309, when it is determined that the coordinate variable j exceeds the other end point V in the map range ("Yes" in step S309), the CPU 13 finishes the processing shown in FIG. 19 and specifies the coordinate position having highest similarity among the similarity values stored in the main memory 14 as a current position, and displays the current position on the point in the climbing map displayed on the display unit 16.

Unlike the foregoing, the process of specifying the current position is not necessarily unique processing achieved by a relative elevation based on an output from the pressure sensor 22 and a three-dimensional path array obtained by dead reckoning processing in the triaxial terrestrial-magnetic sensor 19, the triaxial acceleration sensor 20, and the triaxial gyro sensor 21; the current position may be used as one of indexes that are provided to a next stage of the positioning, including other factors in absolute positioning performed by the GPS antenna 11 and the GPS reception unit 12.

As described in the above, in the present operation example, regardless of a preset climbing course, etc., a current position can be estimated from a shape of a map in accordance with a path array obtained from user's movement in a three-dimensional space.

In the above-described embodiment, the present invention is applied to a climbing navigation apparatus; however, the present invention is not limited thereto, and may be applied to an information terminal device to which an application program is installed for navigation using map data including altitude information, such as a smartphone and a tablet device, or to a wearable device that operates in cooperation with these information terminal devices.

The present invention is not limited to the above described embodiment and various modifications can be made without departing from the scope of the present invention in practical stages. The respective embodiments may be appropriately combined and practiced. In this case, a combined effect is obtained. The above described embodiment incorporates various kinds of inventions, and various kinds of inventions can be extracted by combinations selected from the plurality of disclosed constituent elements. For example, even if some constituent elements are deleted from all the constituent elements disclosed in the embodiment, an arrangement from which some constituent elements are deleted can be extracted as an invention as long as the problem can be solved and the effect can be obtained.

What is claimed is:

1. A position estimation apparatus comprising:
a pressure information acquisition unit that acquires pressure information;
a processor; and
a storage unit that stores a program to be executed by the processor,
wherein the processor is configured to perform, by the program stored in the storage unit:
relative elevation distribution acquisition processing for acquiring a first relative elevation distribution which corresponds to a distribution of relative elevation in an area in a map,
relative elevation distribution generation processing for generating, based on pressure information acquired by the pressure information acquisition unit in a section where a user is in motion for a predetermined length of time, a second relative elevation distribution which corresponds to a distribution of relative elevation in the section where the user is in motion for the predetermined length of time, and
position estimation processing for estimating a position of the section where the user is in motion in the area, based on similarity between the first relative elevation distribution acquired by the relative elevation distribution acquisition processing and the second relative elevation distribution acquired by the relative elevation distribution generation processing.

2. The position estimation apparatus according to claim 1, wherein
the relative elevation distribution acquisition processing includes processing for acquiring the first relative elevation distribution which corresponds to a distribution of relative elevation in an area in a map, based on altitude information to be obtained from map data which includes the altitude information.

3. The position estimation apparatus according to claim 2, wherein
the relative elevation distribution acquisition processing includes processing for acquiring the first relative elevation distribution which corresponds to a distribution of relative elevation along a path of a motion in an area in the map.

4. The position estimation apparatus according to claim 1, wherein
the relative elevation distribution acquisition processing includes processing for acquiring the first relative elevation distribution which corresponds to a distribution of relative elevation in an area in the map where distance information in a horizontal direction is excluded, and
the relative elevation distribution generation processing includes processing for generating the second relative elevation distribution where distance information of a horizontal direction and a moving time in a section where the user is in motion for the predetermined length of time are excluded.

5. The position estimation apparatus according to claim 1, wherein
the relative elevation distribution acquisition processing includes processing for acquiring the first relative elevation distribution which corresponds to a distribution of relative elevation in which an extent of change in elevation in an area in the map is coded, and
the relative elevation distribution generation processing includes processing for generating the second relative elevation distribution in which an extent of change in elevation in a section where the user is in motion for the predetermined length of time is coded converted into a code.

6. A position estimation apparatus comprising:
a pressure information acquisition unit that acquires pressure information;
a processor; and
a storage unit that stores a program to be executed by the processor,
wherein the processor is configured to perform, by the program stored in the storage unit:
relative elevation distribution acquisition processing for acquiring a first relative elevation distribution which corresponds to a distribution of relative elevation in an area in a map,
relative elevation distribution generation processing for generating a second relative elevation distribution which corresponds to a distribution of relative elevation in the section where the user is in motion, by normalizing pressure information that is acquired in a section where the user is in motion, a length of moving time, and a moving distance, and
position estimation processing for estimating, position of the section where the user is in motion in the area, based on similarity between the first relative elevation distribution acquired by the relative elevation distribution acquisition processing and the second relative elevation distribution acquired by the relative elevation distribution generation processing.

7. A position estimation apparatus comprising:
a pressure information acquisition unit that acquires pressure information;
a processor; and
a storage unit that stores a program to be executed by the processor,
wherein the processor is configured to perform, by the program stored in the storage unit:
relative elevation distribution acquisition processing for acquiring the first relative elevation distribution which corresponds to a distribution of relative elevation in a three-dimensional space in an area in the map, and
relative elevation distribution generation processing for generating a second relative elevation distribution which corresponds to a distribution of relative elevation in a section where the user is in motion in a three-dimensional space, based on pressure information acquired by the pressure information acquisition unit for a section where the user is in motion and a motion path acquired by dead reckoning, and
position estimation processing for estimating a position of the section where the user is in motion in the area, based on similarity between the first relative elevation distribution acquired by the relative elevation distribution acquisition processing and the second relative elevation distribution acquired by the relative elevation distribution generation processing.

8. The position estimation apparatus according to claim 7, further comprising an orientation detection unit that detects an orientation to which the user moves, wherein
the relative elevation distribution generation processing includes processing for generating the second relative elevation distribution which corresponds to a distribution of relative elevation in a section where the user is in motion in the three-dimensional space, based on pressure information detected in the section where the user is in motion, and a motion path which includes orientation information detected by the orientation detection unit using dead reckoning.

9. A position estimation method for an apparatus that includes a pressure information acquisition unit that acquires pressure information, the method comprising:
an acquiring relative elevation distribution acquisition step of acquiring a first relative elevation distribution which corresponds to a distribution of relative elevation in an area in a map;
a relative elevation distribution generation step of generating, based on pressure information acquired by the pressure information acquisition unit in a section where a user is in motion for a predetermined length of time, a second relative elevation distribution which corresponds to a distribution of relative elevation in the section where the user is in motion for the predetermined length of time; and
a position estimation step of estimating a current position in the area, based on similarity between the first relative elevation distribution acquired in the relative elevation distribution acquisition step and the second relative elevation distribution acquired in the relative elevation distribution generation step.

10. The position estimation method according to claim 9, wherein the relative elevation distribution acquisition step includes acquiring the first relative elevation distribution which corresponds to a distribution of relative elevation in an area in a map, based on altitude information to be obtained from map data which includes the altitude information.

11. The position estimation method according to claim 10, wherein the relative elevation distribution acquisition step includes acquiring the first relative elevation distribution which corresponds to a distribution of relative elevation along a path of a motion in an area in the map.

12. The position estimation method according to claim 9, wherein
the relative elevation distribution generation step includes generating the second relative elevation distribution by normalizing pressure information that is acquired in a section where the user is in motion for the predetermined length of time, a length of moving time, and a moving distance.

13. The position estimation method according to claim 9, wherein
the relative elevation distribution acquisition step includes acquiring the first relative elevation distribution which corresponds to a distribution of relative elevation in an area in the map where distance information in a horizontal direction is excluded, and
the relative elevation distribution generation step includes generating the second relative elevation distribution where distance information of a horizontal direction and a moving time in a section where the user is in motion for the predetermined length of time are excluded.

14. The position estimation method according to claim 9, wherein
the relative elevation distribution acquisition step includes acquiring the first relative elevation distribution which corresponds to a distribution of relative elevation in which an extent of change in elevation in an area in the map is coded, and
the relative elevation distribution generation step includes generating the second relative elevation distribution in which an extent of change in elevation in a section where the user is in motion for the predetermined length of time is converted into a code.

15. The position estimation method according to claim 9, wherein
the relative elevation distribution acquisition step includes acquiring the first relative elevation distribution which corresponds to a distribution of relative elevation in a three-dimensional space in an area in the map, and
the relative elevation distribution generation step includes generating the second relative elevation distribution which corresponds to a distribution of relative elevation in a section where the user is in motion for the predetermined length of time in a three-dimensional space, based on pressure information acquired by the pressure information acquisition unit for a section where the user is in motion for the predetermined length of time and a motion path acquired by dead reckoning.

16. The position estimation method according to claim 15, wherein
the apparatus further comprises an orientation detection unit that detects an orientation to which the user moves,
the relative elevation distribution generation step includes generating the second relative elevation distribution which corresponds to a distribution of relative elevation in a section where the user is in motion for the predetermined length of time in the three-dimensional space, based on pressure information detected in the section where the user is in motion for the predetermined length of time, and a motion path which includes orientation information detected by the orientation detection unit using dead reckoning.

17. A non-transitory computer-readable storage medium having a program stored thereon which controls a computer incorporated in an apparatus including a pressure information acquisition unit that acquires pressure information, to perform functions comprising:
acquiring a first relative elevation distribution which corresponds to a distribution of relative elevation in an area in a map;
generating, based on pressure information acquired by the pressure information acquisition unit in a section where a user is in motion for a predetermined length of time, a second relative elevation distribution which corresponds to a distribution of relative elevation in the section where the user is in motion for the predetermined length of time; and
estimating a current position in the area, based on similarity between the acquired first relative elevation distribution and the acquired second relative elevation distribution.

* * * * *

UNITED STATES PATENT AND TRADEMARK OFFICE
CERTIFICATE OF CORRECTION

PATENT NO. : 10,746,883 B2  
APPLICATION NO. : 15/867941  
DATED : August 18, 2020  
INVENTOR(S) : Masaru Onozawa Page 1 of 1

It is certified that error appears in the above-identified patent and that said Letters Patent is hereby corrected as shown below:

In the Claims

Claim 5, Column 15, Line 42, after "is" delete "coded".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*